J. D. YOUNG.
PROCESS OF PRESERVING FISH.
APPLICATION FILED FEB. 17, 1908.

921,328.

Patented May 11, 1909.

Witnesses.
P. W. Pezzetti
E. Batchelder

Inventor.
J. D. Young
By Wright, Brown, Quinby & May
Attys

UNITED STATES PATENT OFFICE.

JUDSON D. YOUNG, OF SEATTLE, WASHINGTON, ASSIGNOR OF ONE-FOURTH TO HOWARD B. RITCHIE, OF HYDE PARK, MASSACHUSETTS.

PROCESS OF PRESERVING FISH.

No. 921,328.   Specification of Letters Patent.   Patented May 11, 1909.

Application filed February 17, 1908. Serial No. 416,198.

*To all whom it may concern:*

Be it known that I, JUDSON D. YOUNG, of Seattle, in the county of King and State of Washington, have invented certain new and useful Improvements in Processes of Preserving Fish, of which the following is a specification.

The object of the process which I claim as my invention is to produce an improved food product put upon the market hermetically sealed and ready for immediate use, the product being an integral mass cut without subdivision or disintegration from meat of a halibut or other fish such as cod or haddock, and characterized by a condition of firmness and density which is greater than that of the corresponding portion of the live fish, the product being so firm and solid that it is adapted to be removed as a solid mass from the can without losing its shape. Heretofore canned halibut and other fish have always been characterized by a mushy or semifluid condition which detracts materially from its attractiveness and desirability as an article of food.

My invention consists in the process or method of preserving fish substantially as hereinafter set forth and claimed.

Figure 1:
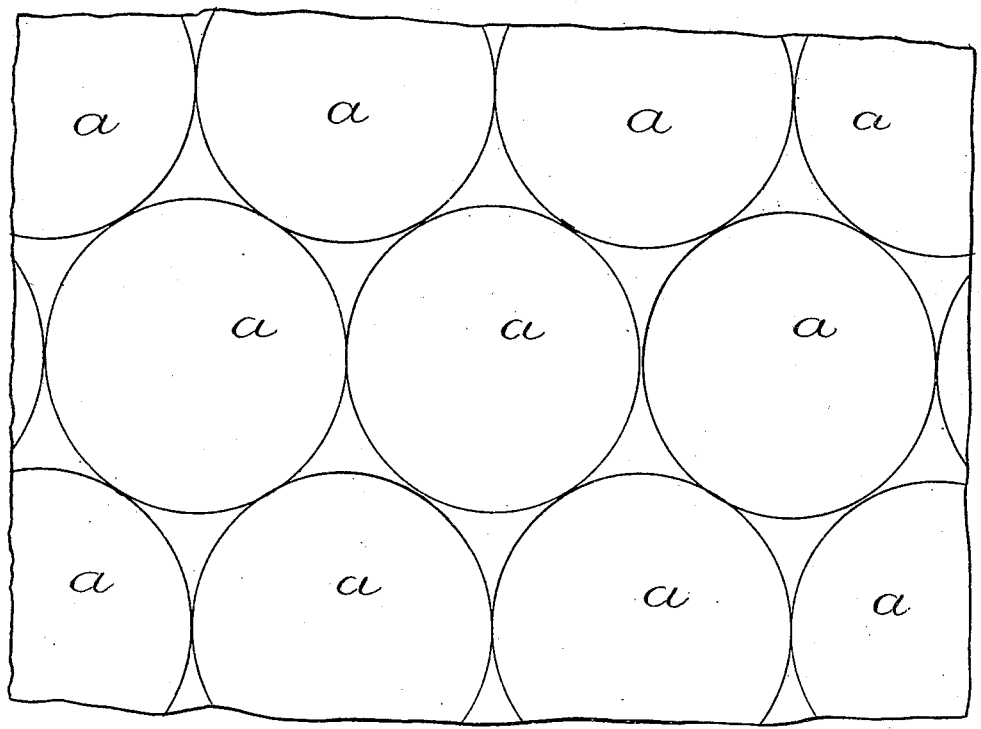
Figure 2:
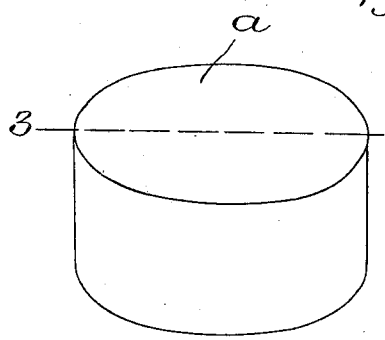
Figure 3:
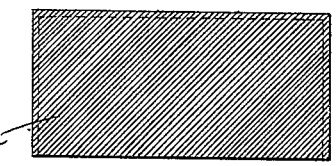
Figure 4:
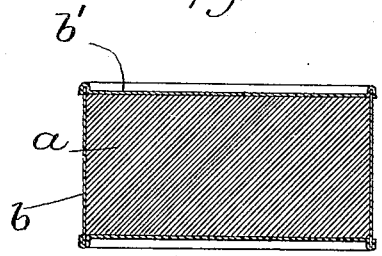

Of the accompanying drawings which illustrate some of the steps of my improved process, Figure 1 represents a side view of a fragment or portion of the edible part of a halibut, showing the method of cutting the same into masses for subsequent treatment and canning. Fig. 2 represents a perspective view of one of the masses cut from the portion shown in Fig. 1. Fig. 3 represents a section on line 3—3 of Fig. 2. Fig. 4 represents in section the mass shown in Figs. 2 and 3, after the same has been contracted and canned.

The same letters of reference indicate the same parts in all the figures.

In carrying out my invention as applied to halibut, I first flitch the body of a fresh halibut by severing the same longitudinally to remove two slabs from opposite sides of the backbone and fins, a portion of one of these slabs being shown in Fig. 1, this portion consisting wholly of edible boneless halibut meat, the fibers of which are unchanged as to their relative positions, so as to have the same association as in the live fish. I then by suitable cutters subdivide the slab into masses $a$ $a$, the cutters being preferably circular so that the mass $a$ is of cylindrical form. The masses thus produced are preferably subjected to a pickling operation which may be conducted as usual in the pickling of fish, the object of the pickling being to impart a slight salty flavor. The quantity of salt in the pickle is not, however, sufficient to have any preservative effect, or to require freshening of the product to make it palatable. The pickled masses are then, subjected to the action of steam, before being placed in cans, preferably at a pressure of about sixty pounds, for a suitable length of time, which may be greater or less according to the size of the mass, the object of the steaming operation being two fold, namely, to expel from the mass all the free water contained therein and correspondingly condense or shrink the mass, and secondly, to completely or partially cook the mass. The steaming operation results in the shrinkage of the mass approximately to the extent indicated by the dotted lines in Fig. 3, the meat being thus condensed and solidified so that it is adapted to retain its shape, its fibers retaining their original association, without liability of separating and forming a mush. The meat thus prepared is next inserted in a sheet metal can $b$ formed to closely fit the mass, care being taken to fill the can with the condensed and solidified meat, the can having a head $b'$ which is suitably united to the body of the can to form an airtight seam or joint. If the masses were placed in the cans before the steaming operation, the shrinkage due to said operation would prevent the existence of a close fit, which close fit is essential to prevent disintegration during handling and transportation. The can and its contents may be subsequently subjected to heat to additionally cook the contents if desired.

The canned product is practically fresh cooked fish, adapted to retain its shape and its characteristic firmness and density for a long period without liability of becoming mushy or losing its firmness. The product is also adapted to be removed as a solid body from the can and cut into slices or portions.

I find that halibut canned in accordance with my invention retains the desirable white color of the meat, the color being unchanged by the steps of the above-described process.

While I have referred particularly to halibut, it is obvious that cod, haddock and other fish may be treated in accordance with my invention.

I claim:—

The method of preserving fish which consists in removing slabs from the body of the fish, then cutting the mass transversely into pieces of definite area in cross-section, then subjecting the pieces to steam of sufficiently high temperature to expel water and reduce the area of said pieces a predetermined amount, and finally hermetically sealing the pieces in cans or packages which closely fit the condensed pieces.

In testimony whereof I have affixed my signature, in presence of two witnesses.

JUDSON D. YOUNG.

Witnesses:
C. F. BROWN,
P. W. PEZZETTI.